(12) United States Patent
Kim et al.

(10) Patent No.: US 11,279,412 B2
(45) Date of Patent: Mar. 22, 2022

(54) VEHICLE BODY

(71) Applicants: Hyundai Motor Company, Seoul (KR); Kia Motors Corporation, Seoul (KR)

(72) Inventors: Won Oh Kim, Ansan-si (KR); Ho Yeon Kim, Daegu (KR); Byung Gyu Kim, Suwon-si (KR); Chul Hee Heo, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/929,663

(22) Filed: Jul. 15, 2020

(65) Prior Publication Data

US 2021/0171111 A1 Jun. 10, 2021

(30) Foreign Application Priority Data

Dec. 5, 2019 (KR) .................. 10-2019-0160979

(51) Int. Cl.
| | |
|---|---|
| *B62D 23/00* | (2006.01) |
| *B62D 25/14* | (2006.01) |
| *B60R 19/02* | (2006.01) |
| *B62D 25/04* | (2006.01) |
| *B62D 27/06* | (2006.01) |
| *B62D 25/06* | (2006.01) |
| *B62D 25/20* | (2006.01) |
| *B62D 27/02* | (2006.01) |
| *B62D 21/15* | (2006.01) |

(52) U.S. Cl.
CPC .......... *B62D 23/005* (2013.01); *B60R 19/023* (2013.01); *B62D 21/15* (2013.01); *B62D 25/04* (2013.01); *B62D 25/06* (2013.01); *B62D 25/14* (2013.01); *B62D 25/2036* (2013.01); *B62D 27/02* (2013.01); *B62D 27/06* (2013.01)

(58) Field of Classification Search
CPC ...... B62D 21/02; B62D 21/09; B62D 23/005; B62D 27/023; B60R 19/04
USPC .... 296/209, 29, 30, 205; 280/791, 784, 790, 280/795–798, 107, 783
See application file for complete search history.

(56) References Cited

U.S. PATENT DOCUMENTS

| | | | |
|---|---|---|---|
| 5,332,281 A * | 7/1994 | Janotik ................. | B62D 21/02 296/203.03 |
| 6,695,368 B1 | 2/2004 | Weykamp et al. | |

(Continued)

FOREIGN PATENT DOCUMENTS

| | | |
|---|---|---|
| DE | 102005026791 A1 | 1/2007 |
| EP | 1329374 A1 | 7/2003 |

(Continued)

*Primary Examiner* — Dennis H Pedder
(74) *Attorney, Agent, or Firm* — Slater Matsil, LLP

(57) ABSTRACT

A vehicle body includes a rigid member having a tubular shape that is closed in cross-section. The rigid member includes a front member, a dash cross member, a rear member, and a center member, which form main frames at the front, rear, and center of the bottom of the vehicle body. The rigid member also includes pillar members that form main frames at both sides of the top of the vehicle body. Connecting members that each have a tubular shape that is open at one surface thereof are connected to the members of the rigid member.

20 Claims, 10 Drawing Sheets

(56) References Cited

U.S. PATENT DOCUMENTS

| | | | |
|---|---|---|---|
| 6,926,350 B2* | 8/2005 | Gabbianelli | B62D 21/11 |
| | | | 296/187.11 |
| 7,758,107 B2 | 7/2010 | Ratsos et al. | |
| 9,505,293 B2 | 11/2016 | Bowles et al. | |
| 9,849,920 B2 | 12/2017 | Kawata et al. | |
| 10,618,489 B2 | 4/2020 | Hisamura et al. | |
| 2001/0000119 A1* | 4/2001 | Jaekel | B23K 26/38 |
| | | | 296/29 |
| 2006/0192375 A1* | 8/2006 | Davis | B62K 19/46 |
| | | | 280/781 |
| 2009/0121106 A1 | 5/2009 | An | |
| 2013/0277137 A1 | 10/2013 | Kawaguchi et al. | |
| 2021/0171125 A1 | 6/2021 | Yong et al. | |

FOREIGN PATENT DOCUMENTS

| | | |
|---|---|---|
| FR | 2822431 A1 | 9/2002 |
| JP | H0411581 A | 1/1992 |
| JP | 2013208968 A | 10/2013 |
| KR | 100243584 B1 | 3/2000 |
| KR | 20090035148 A | 4/2009 |
| WO | 2010071664 A1 | 6/2010 |

* cited by examiner

[FIG. 1]
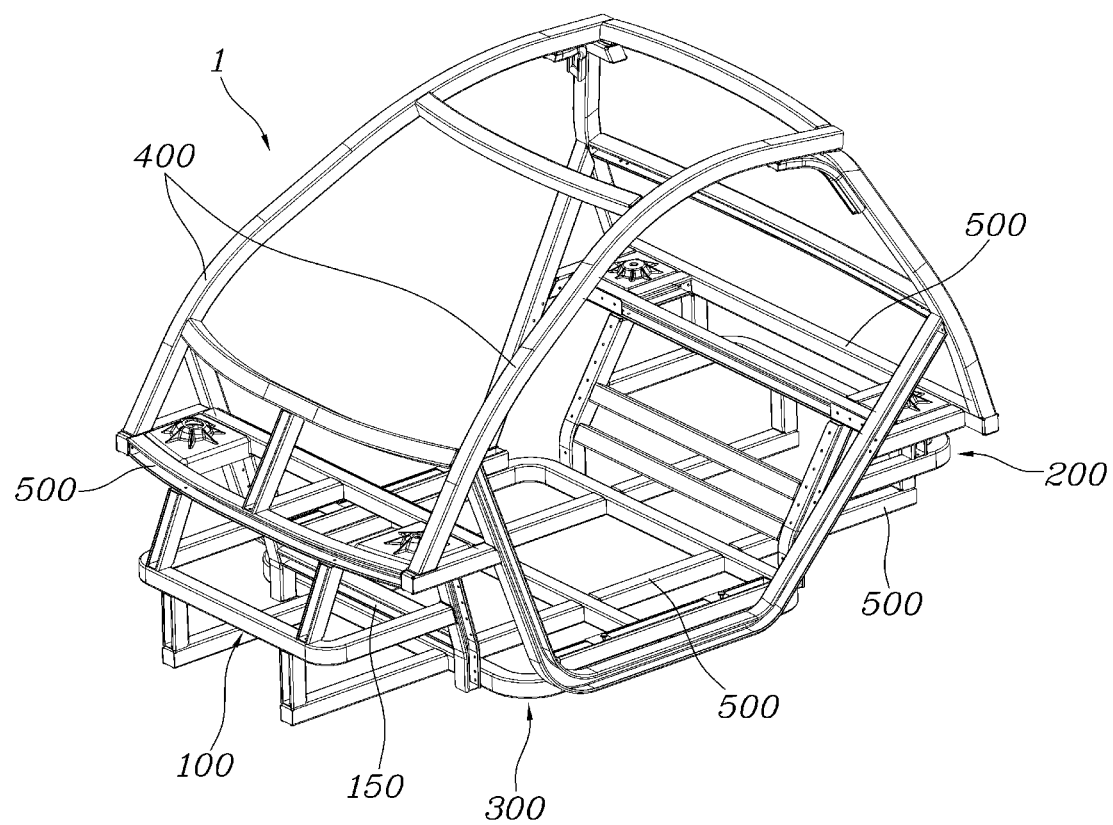

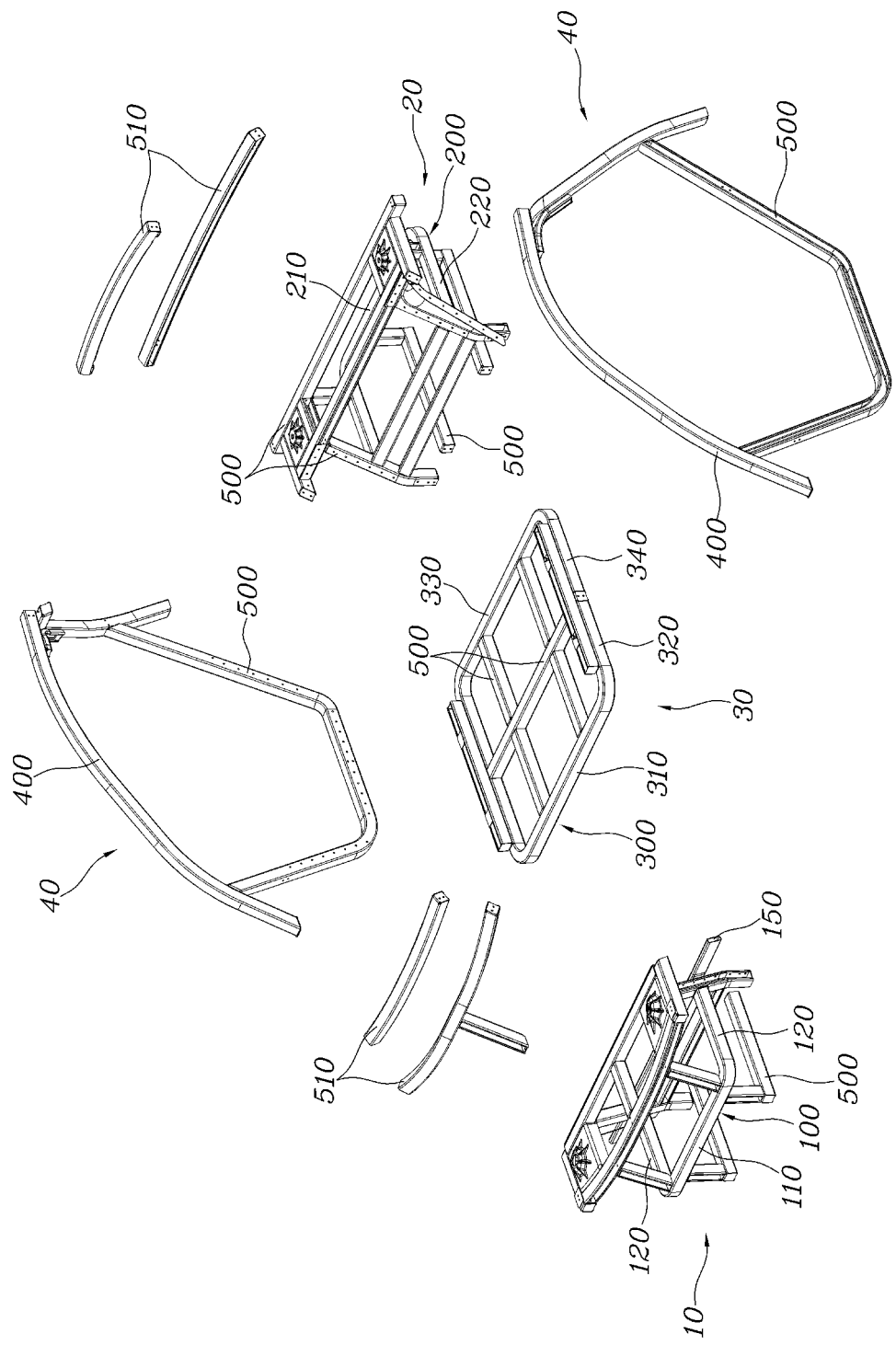

[FIG. 3]
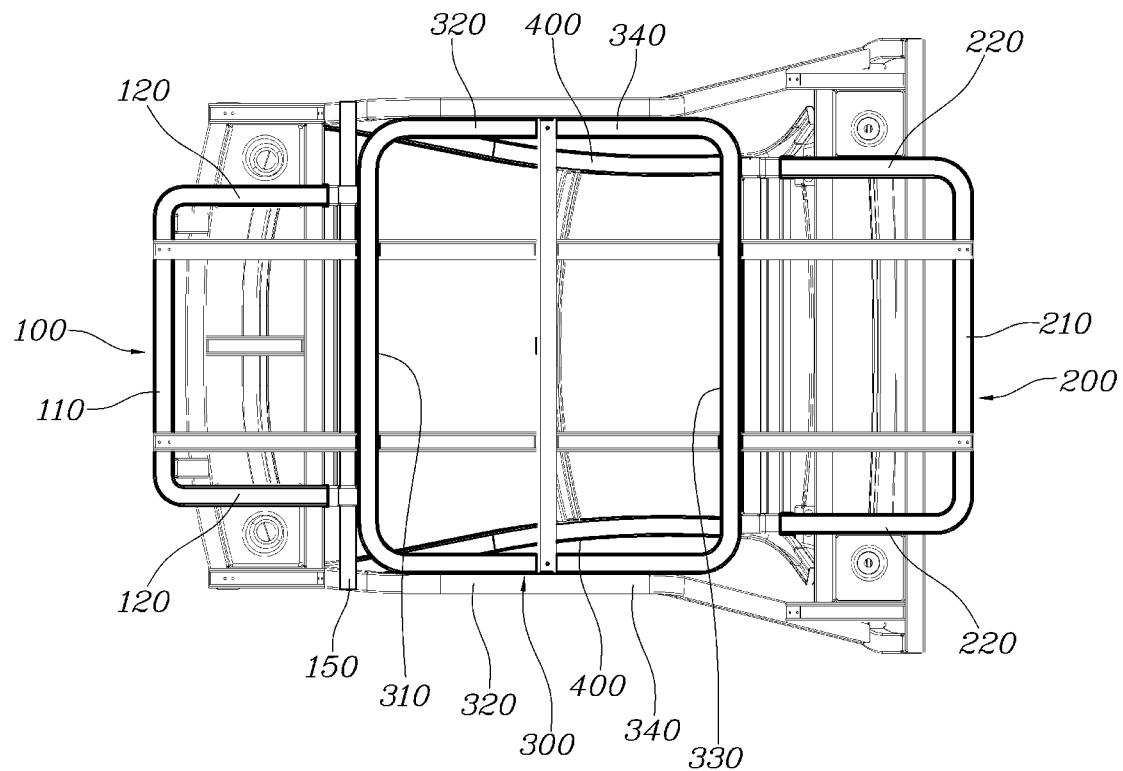

[FIG. 4]
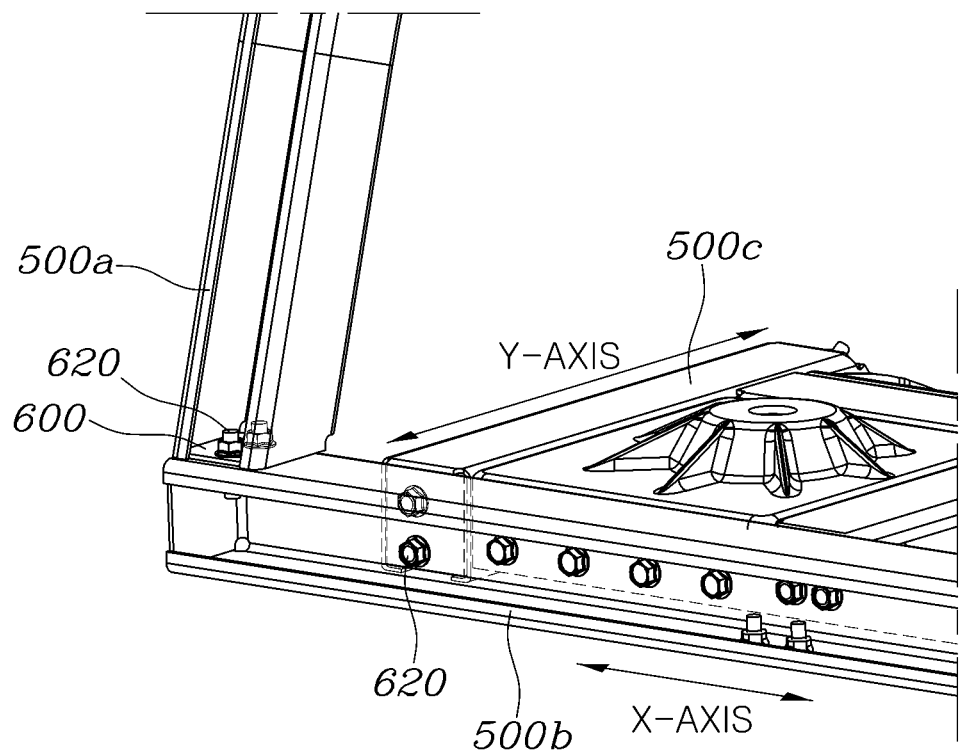

[FIG. 5]
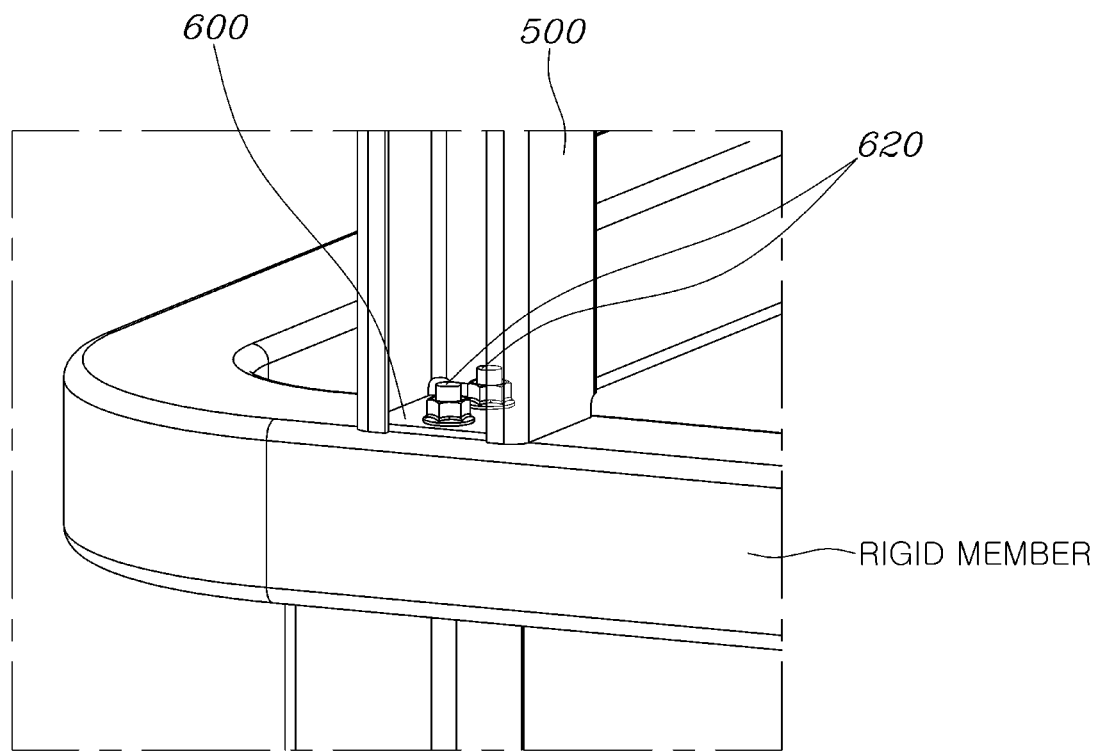

[FIG. 6]
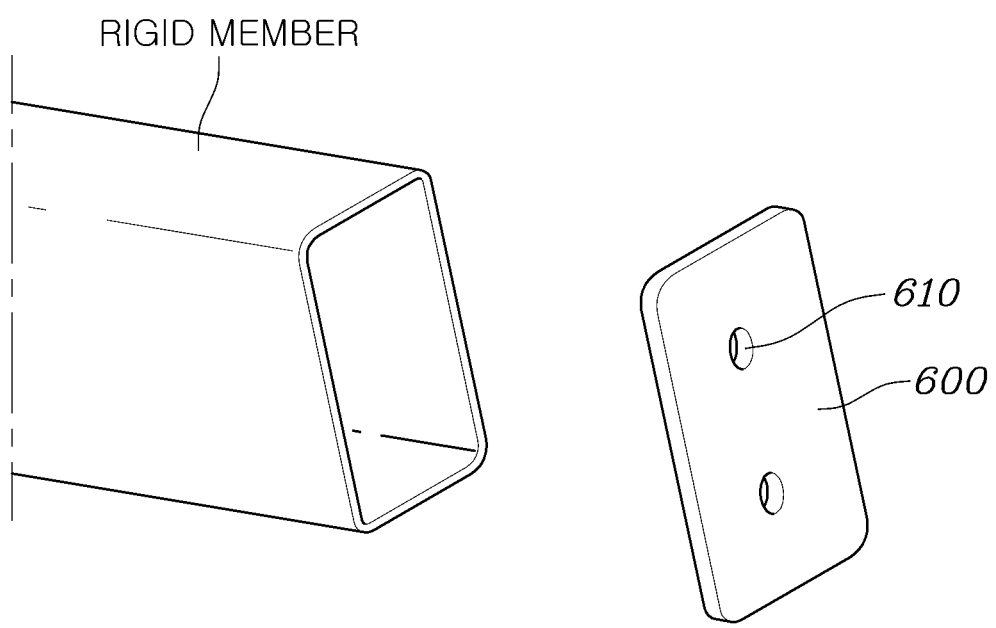

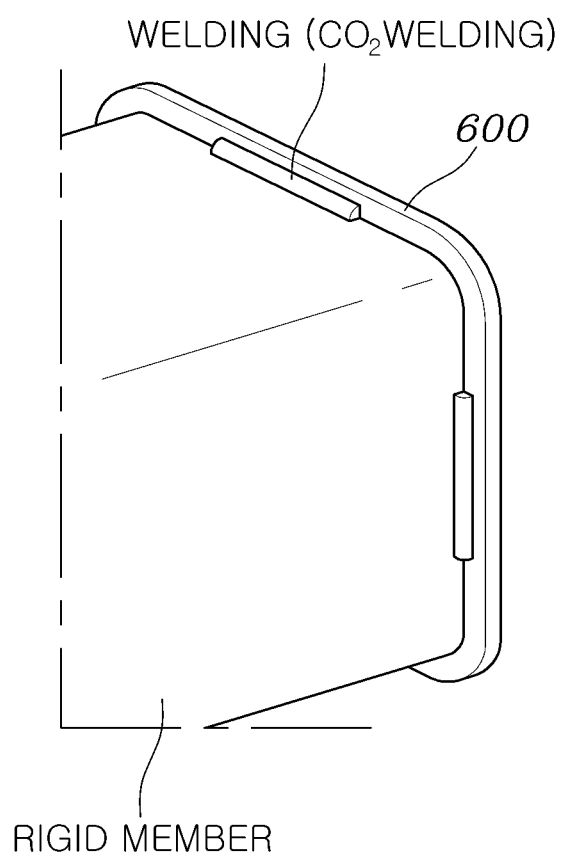

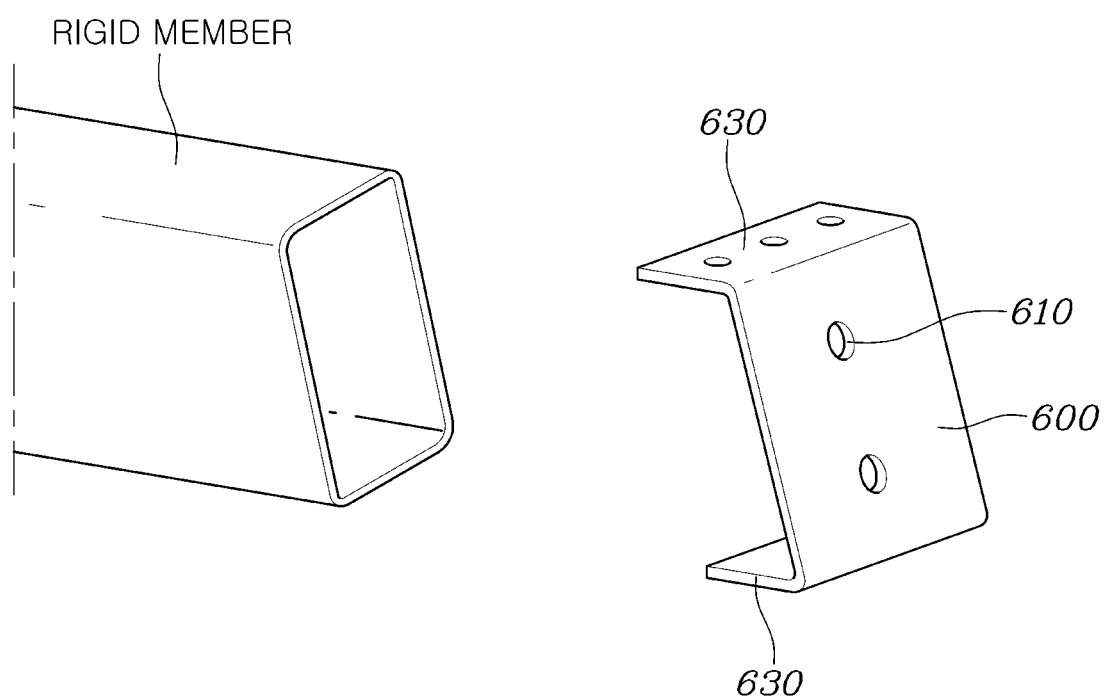
[FIG. 8]

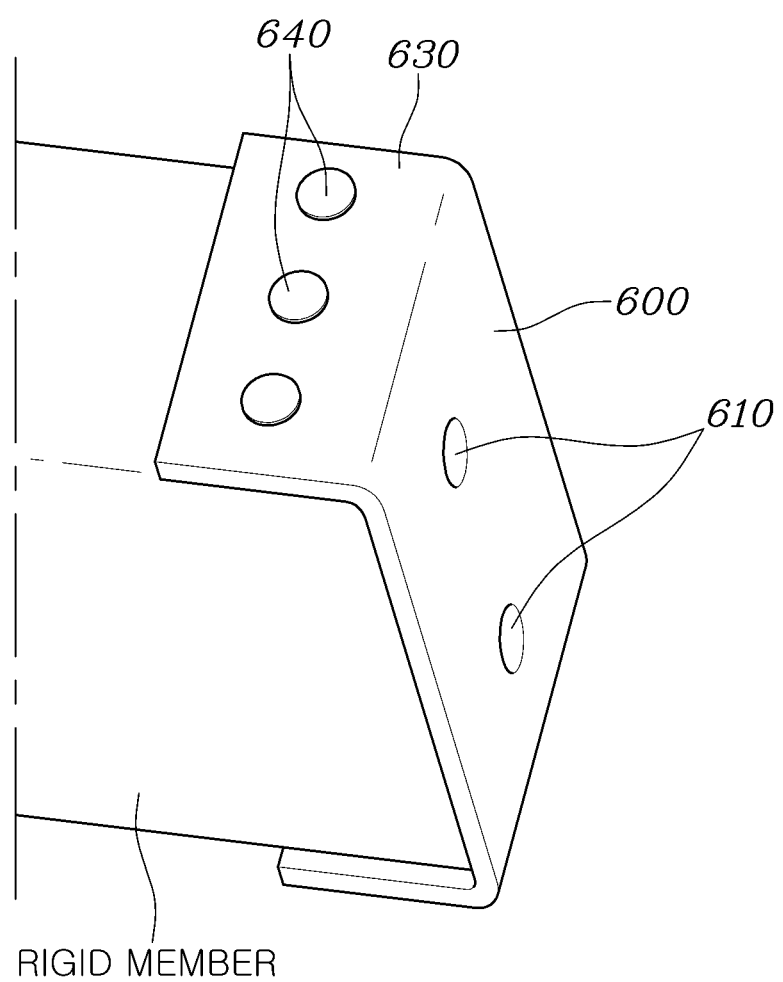
[FIG. 9]

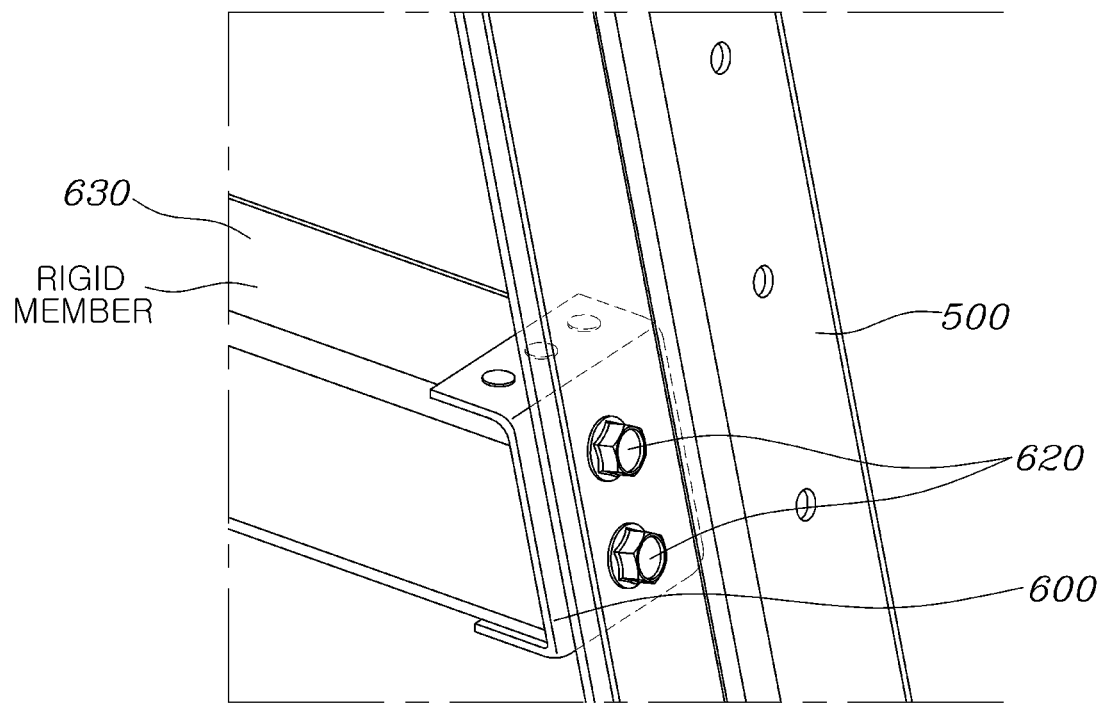
[FIG. 10]

VEHICLE BODY

CROSS-REFERENCE TO RELATED APPLICATIONS

This application claims priority to Korean Patent Application No. 10-2019-0160979, filed on Dec. 5, 2019, which application is hereby incorporated herein by reference.

TECHNICAL FIELD

The present disclosure relates to a vehicle body that can be simply assembled while maintaining its rigidity.

BACKGROUND

Conventional compact vehicles have a monocoque body structure in which only a rear door is cut out of a typical vehicle design.

However, such a typical rear-door-removed monocoque body structure is disadvantageous in that it has a low degree of freedom of design in addition to requiring large-scale investments in equipment such as press plants, body welding plants, and painting plants since the monocoque body structure is made by machining and welding parts with press working using molds.

For this reason, a large number of changes in design are required at the time of small quantity batch production or smart factory production, which may lead to an increase in cost of production due to a rapid increase in the number of molds.

Accordingly, a new body structure is required that can be produced at low cost in a smart factory environment while coping with various designs.

The foregoing is intended merely to aid in the understanding of the background of the present disclosure, and is not intended to mean that the present disclosure falls within the purview of the related art that is already known to those skilled in the art.

SUMMARY

Accordingly, embodiments of the present disclosure can address problems occurring in the related art and propose a vehicle body that can be simply assembled while maintaining its rigidity.

In accordance with an aspect of the present disclosure, a vehicle body includes a rigid member having a tubular shape that is closed in cross-section to make the vehicle body have strength and rigidity. The rigid member includes a front member, a dash cross member, a rear member, and a center member, which form main frames at the front, rear, and center of the bottom of the vehicle body. The rigid member also includes pillar members which form main frames at both sides of the top of the vehicle body. Connecting members, each having a tubular shape that is open at one surface thereof, are connected to the members of the rigid member.

The front member and the dash cross member may each have a rectangular rim to absorb impacts and support the vehicle body in the event of vehicle forward collision. The rear member may have a U-shaped rim to absorb impacts and support the vehicle body in the event of vehicle rear collision. The center member may have a rectangular rim to support the bottom of a cabin in a vehicle. The pillar members may extend upward from the front of the vehicle toward its roof to define an upper portion of the cabin.

The front member may include a front bumper beam laterally formed at the front bottom of a vehicle, and front side members formed by bending both ends of the front bumper beam rearward.

The dash cross member may be laterally provided between the front member and a cabin of the vehicle and be connected to rear ends of the front side members.

The rear member may include a rear bumper beam laterally formed at the rear bottom of a vehicle, and rear side members formed by bending both ends of the rear bumper beam forward.

The center member may include a front cross member laterally formed at the front bottom of a vehicle, front side sills formed by bending both ends of the front cross member rearward, a rear cross member laterally formed at the rear bottom of the vehicle, and rear side sills formed by bending both ends of the rear cross member forward, respective front ends of the rear side sills being connected to respective rear ends of the front side sills with them facing each other.

The vehicle body may further include a front floor module formed by connecting the connecting members to the front member and the dash cross member, the front floor module being configured to support a front structure of a vehicle, a rear floor module formed by connecting the connecting members to the rear member, the rear floor module being configured to support a rear structure of a vehicle, a center floor module formed by connecting the connecting members to the center member, the center floor module being connected between a lower portion of the front floor module and a lower portion of the rear floor module, and pillar side modules formed by connecting the connecting members to the pillar members, the front and rear of each of the pillar side modules being connected to the front and rear floor modules while both lower ends of the pillar side module are connected to the center floor module.

The vehicle body may further include a fastening plate fixed to and configured to cover an end of the rigid member and each of the connecting members, and the fastening plate may be fastened to another connecting member or rigid member by a fastener therethrough in a state in which the fastening plate is connected to an outer surface of the connecting member or rigid member.

The fastening plate may be fixed to the rigid member by welding a boundary therebetween.

The fastening plate may have bending parts formed by bending both ends thereof, and the bending parts may be fixed to the rigid member by a connector therethrough in a state in which the bending parts overlap both sides of the rigid member.

As apparent from the above description, the present disclosure has an effect of optimizing the weight/cost/structure of the vehicle even while maintaining the basic strength and rigidity of the vehicle body since, from among the frames of the vehicle body, the main members, which require strength and rigidity above a certain level, each have a pipe shape that is closed in cross-section and the other members each have a pipe shape that is open in cross-section.

In addition, since the rigid member and each connecting member are manufactured by standardization and are each modularized by changing only the length and bending part thereof, it is possible to secure expandability in developing the vehicle body and of course to appropriately cope with small quantity batch production so that the vehicle body can be produced at low cost in the smart factory environment.

Furthermore, by assembling the rigid member and the connecting members by bolting or riveting to form the vehicle body, large-scale equipment such as press plants, body welding plants, and painting plants is unnecessary. Therefore, it is possible to cope with the smart factory environment and of course to simply the assembly of the vehicle body for an improvement in assembly capability. In addition, it is possible to significantly enhance the torsional rigidity of the assembled parts and to maintain the strength and rigidity of the vehicle body.

BRIEF DESCRIPTION OF THE DRAWINGS

The above and other objects, features and advantages of the present disclosure will be more clearly understood from the following detailed description taken in conjunction with the accompanying drawings, in which:

FIG. 1 is a view illustrating a vehicle body structure according to the present disclosure;

FIG. 2 is an exploded view illustrating the vehicle body structure according to the present disclosure;

FIG. 3 is a view illustrating the vehicle body structure according to the present disclosure when viewed from the bottom;

FIG. 4 is a view illustrating a coupling structure between connecting members according to the present disclosure;

FIG. 5 is a view illustrating a structure in which one connecting member is coupled to a rigid member according to the present disclosure;

FIG. 6 is a view illustrating a state before a fastening plate is coupled to a rigid member according to a first embodiment of the present disclosure;

FIG. 7 is a view illustrating a state in which the fastening plate is coupled to the rigid member in FIG. 6;

FIG. 8 is a view illustrating a state before a fastening plate is coupled to a rigid member according to a second embodiment of the present disclosure;

FIG. 9 is a view illustrating a state in which the fastening plate is coupled to the rigid member in FIG. 8; and FIG. 10 is a view illustrating a state in which the rigid member is coupled to one connecting member through the fastening plate in FIG. 9.

DETAILED DESCRIPTION OF ILLUSTRATIVE EMBODIMENTS

Reference will now be made in detail to preferred embodiments of the present disclosure, examples of which are illustrated in the accompanying drawings.

A vehicle body 1 according to the present disclosure largely includes a rigid member and connecting members 500.

The present disclosure will be described in detail with reference to FIG. 1. The rigid member has a rectangular tubular shape that is closed in cross-section to make the vehicle body 1 have strength and rigidity. The rigid member includes a front member 100, a dash cross member 150, a rear member 200, and a center member 300, which form main frames at the front, rear, and center of the bottom of the vehicle body 1, and pillar members 400 which form main frames at both sides of the top of the vehicle body 1.

The connecting members 500 each have a U-shaped tubular shape that is open at one surface thereof and are connected to the members of the rigid member. In this case, each of the connecting members 500 may be bent inward at both ends of the open portion thereof to obtain predetermined rigidity and strength.

For reference, the connecting members 500 may be used to interconnect the individual members of the rigid member or other connecting members, or may be used to assemble chassis/interior/exterior parts, or may be applied to parts required for local reinforcement.

For example, referring to FIGS. 1 and 3, the front member 100 is provided at the front bottom of the vehicle body 1 and the dash cross member 150 is provided at the rear end of the front member 100.

The front member 100 and the dash cross member 150 each have a rectangular rim to absorb impacts and support the body in the event of vehicle forward collision.

The rear member 200 is provided at the rear bottom of the vehicle body 1.

The rear member 200 has a U-shaped rim that is open at the front thereof to absorb impacts and support the body in the event of vehicle rear collision.

The center member 300 is provided at the middle bottom of the vehicle body 1, which is beneath the front and rear members 100 and 200.

The center member 300 has a rectangular rim to support the bottom of the cabin in the vehicle.

Each of the pillar members 400 is provided to extend upward from the front of the vehicle body 1. The pillar member 400 extends upward from the front of the vehicle toward its roof to define the upper portion of the cabin.

That is, from among the lower and upper frames of the vehicle body 1, the main members, which require strength and rigidity above a certain level, each have a pipe shape that is closed in cross-section and the other members each have a pipe shape that is open in cross-section, thereby allowing the weight/cost/structure of the vehicle to be optimized even while maintaining the basic strength and rigidity of the vehicle body 1.

The members of the rigid member will be structurally described in more detail with reference to FIG. 2.

Referring to the drawing, the front member 100 has a front bumper beam 110 that laterally traverses the front bottom of the vehicle, and the front bumper beam 110 is bent and extends rearward from both ends thereof to form front side members 120.

That is, since the front member 100 is closed in cross-section, the front member 100 effectively absorbs energy and supports the body in the event of forward collision.

The dash cross member 150 crosses laterally between the front member 100 and the cabin, and the respective rear ends of the front side members 120 are connected to both front surfaces of the dash cross member 150. In this case, the connecting members 500 may be further assembled between the front member 100 and the dash cross member 150.

That is, since the dash cross member 150 is closed in cross-section, the dash cross member 150 absorbs energy and structurally maintains and protect the cabin in the event of forward collision, together with the front member 100.

The rear member 200 has a rear bumper beam 210 that laterally traverses the rear bottom of the vehicle, and the rear bumper beam 210 is bent and extends forward from both ends thereof to form rear side members 220.

That is, since the rear member 200 is closed in cross-section, the rear member 200 effectively absorbs energy and supports the body in the event of rear collision.

The center member 300 has a front cross member 310 that laterally traverses the front bottom at the center of the vehicle, and the front cross member 310 is bent and extends rearward from both ends thereof to form front side sills 320.

The center member 300 has a rear cross member 330 that laterally traverses the rear bottom at the center of the vehicle, and the rear cross member 330 is bent and extends forward from both ends thereof to form rear side sills 340.

In this case, the respective front ends of the rear side sills 340 are connected to the respective rear ends of the front side sills 320 with them facing each other, so that the center member 300 has rectangular shape at the center bottom of the vehicle. The connecting members 500 may be further assembled between the rear side sills 340 and the front side sills 320.

That is, since the center member 300 is closed in cross-section, the center member 300 strengthens the bottom of the cabin and particularly protects and maintains the interior bottom of the cabin with safety.

The pillar member 400 may be an A-pillar member and supports parts leading from a cowl in the front of the vehicle to a windshield and a roof.

That is, since the pillar member 400 is closed in cross-section, the pillar member 400 strengthens the top of the cabin and particularly protects and maintains the interior top of the cabin with safety.

As described above, the rigid member, which requires strength and rigidity from among the constituent members of the vehicle body 1, has a pipe shape that is closed in cross-section, thereby maintaining the basic strength and rigidity of the vehicle body 1.

The rigid member of the present disclosure is assembled to the connecting members 500 for modularization, and the modularized parts are assembled to each other to form the vehicle body 1.

Referring to FIG. 2, the connecting members 500 are connected to the front member 100 and the dash cross member 150 to form a front floor module 10 and the front structure of the vehicle is supported by the front floor module 10.

The connecting members 500 are connected to the rear member 200 to form a rear floor module 20 and the rear structure of the vehicle is supported by the rear floor module 20.

The connecting members 500 are connected to the center member 300 to form a center floor module 30 and the center floor module 30 is connected between the lower portion of the front floor module 10 and the lower portion of the rear floor module 20.

The connecting members 500 are connected to the pillar members 400 to form pillar side modules 40 and the front and rear of each of the pillar side modules 40 are connected to the front and rear floor modules 10 and 20 while both lower ends of the pillar side module 40 are connected to the center floor module 30.

That is, the connecting members 500 are assembled on the outer surface of the rigid member and other connecting members are organically assembled on the outer surfaces of the connecting members 500, thereby forming individual modules. The modules are then assembled to each other to form the vehicle body 1.

For example, the front and rear floor modules 10 and 20 are assembled to the respective front and rear of the center floor module 30 and the pillar side modules 40 are assembled thereon. A large number of inline assembly members 510 are assembled between the two pillar side modules 40 to form the vehicle body 1.

As described above, in the present disclosure, the rigid member and each connecting member 500 are manufactured by standardization and are each modularized by changing only the length and bending part thereof. Thus, it is possible to secure expandability in developing the vehicle body 1 and of course to appropriately cope with small quantity batch production so that the vehicle body 1 can be produced at low cost in a smart factory environment.

Meanwhile, the connecting member 500 and rigid member of the present disclosure may be assembled to each other by a fastening plate 600 and a fastener 620. The fastener may be any fastening element.

Specifically, the fastening plate 600 is fixed to and covers the end of the connecting member 500 or rigid member, and the fastening plate 600 is fastened to another connecting member or rigid member by the fastener 620 therethrough in the state in which the fastening plate 600 is connected to the outer surface of the connecting member or rigid member.

The fastening plate 600 may have a rectangular plate shape that corresponds to or is larger than the cross-sectional area of the connecting member 500 or rigid member, and may be separately provided or integrally formed and folded with the corresponding member. The fastener 620 may be bolts/nuts or rivets and the fastening plate 600 may have fastening holes 610 such as bolting holes for smooth fastening of the fastener 620.

FIG. 4 is a view illustrating a coupling structure between the connecting members 500. Referring to the drawing, the fastening plate 600 is fixed to the lower end of a first vertical connecting member 500a to cover the end thereof and the fastening plate 600 is bolted to a second connecting member 500b provided in an X-axis direction on the lower end of the first connecting member 500a in the state in which the base surface of the fastening plate 600 is in contact with the top end of the second connecting member 500b.

In this case, the first and second connecting members 500a and 500b are each open at one surface thereof, so that the nuts may be inserted through the open portion of the second connecting member 500b and the bolts may be tightened through the open portion of the first connecting member 500a using a tool. Thus, the assembly between the connecting members 500 is easily performed.

In addition, the fastening plate 600 is fixed to and covers the end of a third connecting member 500c provided in a Y-axis direction, and the fastening plate 600 is bolted to the second connecting member 500b in the state in which the outer surface of the fastening plate 600 is in contact with the back surface of the second connecting member 500b disposed orthogonal to the third connecting member 500c.

In this case, the second and third connecting members 500b and 500c are each open at one surface thereof, so that the nuts may be inserted through the open portion of the third connecting member 500c and the bolts may be tightened through the open portion of the second connecting member 500b using the tool. Thus, the assembly between the connecting members 500 is easily performed.

FIG. 5 is a view illustrating a structure in which one connecting member 500 is coupled to the rigid member. Referring to the drawing, the fastening plate 600 is fixed to the lower end of the vertical connecting member 500 to cover the end thereof, and the fastening plate 600 is bolted to the rigid member in the state in which the base surface of the fastening plate 600 is in contact with the upper surface of the rigid member provided on the lower end of the connecting member 500.

In this case, the connecting member 500 is open at one surface thereof, so that the nuts may be inserted into and fixed to the inner surface of the rigid member and the bolts may be tightened through the open portion of the connecting member 500 using the tool. Thus, the assembly between the rigid member and the connecting member 500 is easily performed.

According to a first embodiment in which a fastening plate 600 is coupled to a rigid member, the fastening plate 600 may be fixed to the end of the rigid member by welding the boundary therebetween.

Referring to FIGS. 6 and 7, the fastening plate 600 has a rectangular plate shape that covers the end of the rigid member. The fastening plate 600 is fixed to the end of the rigid member by welding the boundary between the fastening plate 600 and the rim of the rigid member in the state in which the fastening plate 600 covers the end of the rigid member.

In this case, nuts are pre-assembled to the inner surface of the fastening plate 600 through fastening holes 610 formed in the fastening plate 600, so that another member may be bolted through the fastening holes 610.

According to a second embodiment in which a fastening plate 600 is coupled to a rigid member, the fastening plate 600 may have bending parts 630 formed by bending both ends thereof and the bending parts 630 may be fixed to the rigid member by a connector 640 therethrough in the state in which the bending parts 630 overlap both sides of the rigid member.

The connector 640 may be bolts/nuts or rivets.

Referring to FIGS. 8 and 9, the fastening plate 600 has a rectangular plate shape that covers the end of the rigid member. The fastening plate 600 has the bending parts 630 bent from both ends thereof. The bending parts 630 are assembled to both sides of the rigid member by riveting the bending parts 630 in the state in which the fastening plate 600 covers the end of the rigid member, thereby fixing the fastening plate 600 to the end of the rigid member.

In this case, the nuts are pre-assembled to the inner surface of the fastening plate 600 through fastening holes 610 formed in the fastening plate 600, so that another member may be bolted through the fastening holes 610.

FIG. 10 is a view illustrating a state in which the rigid member is coupled to one connecting member 500 through the fastening plate 600 in FIG. 9. Referring to the drawing, the fastening plate 600 is fixed to the end of the rigid member, and the fastening plate 600 is bolted to the connecting member 500 in the state in which the outer surface of the fastening plate 600 is in contact with the back surface of the connecting member 500.

In this case, the connecting member 500 is open at one surface thereof, so that the nuts may be fixed to the inner surface of the fastening plate 600 and the bolts may be tightened through the open portion of the connecting member 500 using the tool. Thus, the assembly between the rigid member and the connecting member 500 is easily performed.

That is, by assembling the rigid member and the connecting members 500 by bolting or riveting to form the vehicle body 1, large-scale equipment such as press plants, body welding plants, and painting plants is unnecessary. Therefore, it is possible to cope with the smart factory environment and of course to simply the assembly of the vehicle body 1 for an improvement in assembly capability. In addition, it is possible to significantly enhance the torsional rigidity of the assembled parts and to maintain the strength and rigidity of the vehicle body 1.

Although the preferred embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A vehicle body comprising:
    a rigid member having a tubular shape that is closed in cross-section, the rigid member comprising a front member, a dash cross member, a rear member, and a center member, which form main frames at the front, rear, and center of the bottom of the vehicle body, the rigid member also comprising pillar members that form main frames at both sides of the top of the vehicle body;
    connecting members, each connecting member having a tubular shape that is open at one surface thereof, the connecting members being connected to the members of the rigid member; and
    a fastening plate fixed to and configured to cover an end of the rigid member and each of the connecting members, wherein the fastening plate is fastened to another connecting member or rigid member by a fastener therethrough in a state in which the fastening plate is connected to an outer surface of the connecting member or rigid member.

2. The vehicle body according to claim 1, wherein:
    the front member and the dash cross member each have a rectangular rim to absorb impacts and support the vehicle body in the event of vehicle forward collision;
    the rear member has a U-shaped rim to absorb impacts and support the vehicle body in the event of vehicle rear collision;
    the center member has a rectangular rim to support the bottom of a cabin in a vehicle; and
    the pillar members extend upward from the front of the vehicle toward its roof to define an upper portion of the cabin.

3. The vehicle body according to claim 1, wherein the front member comprises:
    a front bumper beam laterally formed at the front bottom of a vehicle; and
    front side members formed by bending both ends of the front bumper beam rearward.

4. The vehicle body according to claim 3, wherein the dash cross member is provided laterally between the front member and a cabin of the vehicle and is connected to rear ends of the front side members.

5. The vehicle body according to claim 1, wherein the rear member comprises:
    a rear bumper beam laterally formed at the rear bottom of a vehicle; and
    rear side members formed by bending both ends of the rear bumper beam forward.

6. The vehicle body according to claim 1, wherein the center member comprises:
    a front cross member laterally formed at the front bottom of a vehicle;
    front side sills formed by bending both ends of the front cross member rearward;
    a rear cross member laterally formed at the rear bottom of the vehicle; and
    rear side sills formed by bending both ends of the rear cross member forward, respective front ends of the rear side sills being connected to respective rear ends of the front side sills with them facing each other.

7. The vehicle body according to claim 1, further comprising:
    a front floor module formed by connecting the connecting members to the front member and the dash cross member, the front floor module being configured to support a front structure of a vehicle;

a rear floor module formed by connecting the connecting members to the rear member, the rear floor module being configured to support a rear structure of the vehicle;
a center floor module formed by connecting the connecting members to the center member, the center floor module being connected between a lower portion of the front floor module and a lower portion of the rear floor module; and
pillar side modules formed by connecting the connecting members to the pillar members, the front and rear of each of the pillar side modules being connected to the front and rear floor modules while both lower ends of the pillar side module are connected to the center floor module.

8. The vehicle body according to claim 1, wherein the fastening plate is fixed to the rigid member by welding a boundary therebetween.

9. The vehicle body according to claim 1, wherein:
the fastening plate has bending parts formed by bending both ends thereof; and
the bending parts are fixed to the rigid member by a connector therethrough in a state in which the bending parts overlap both sides of the rigid member.

10. The vehicle body according to claim 1, wherein the tubular shape of the rigid member is designed to make the vehicle body have strength and rigidity.

11. A vehicle body comprising:
a front member having a tubular shape that is closed in cross-section, wherein the front member comprises a front bumper beam laterally formed at the front bottom of a vehicle and front side members formed by bending both ends of the front bumper beam rearward;
a dash cross member having a tubular shape that is closed in cross-section, wherein the dash cross member is provided laterally between the front member and a cabin of the vehicle and is connected to rear ends of the front side members;
a rear member having a tubular shape that is closed in cross-section, wherein the rear member comprises a rear bumper beam laterally formed at the rear bottom of a vehicle and rear side members formed by bending both ends of the rear bumper beam forward;
a center member having a tubular shape that is closed in cross-section, the front member, dash cross member, rear member and center member forming main frames at the front, rear, and center of the bottom of the vehicle body;
pillar members that form main frames at both sides of the top of the vehicle body, each pillar member having a tubular shape that is closed in cross-section;
connecting members, each connecting member having a tubular shape that is open at one surface thereof, wherein each connecting member is connected to an associated rigid member element, each rigid member element being one of the front member, the dash cross member, the rear member, the center member and the pillar members; and
a plurality of fastening plates, wherein each connecting member is connected to the associated rigid member element by a fastening plate.

12. The vehicle body according to claim 11, wherein:
the front member and the dash cross member each have a rectangular rim to absorb impacts and support the vehicle body in the event of vehicle forward collision;
the rear member has a U-shaped rim to absorb impacts and support the vehicle body in the event of vehicle rear collision;
the center member has a rectangular rim to support the bottom of a cabin in a vehicle; and
the pillar members extend upward from the front of the vehicle toward its roof to define an upper portion of the cabin.

13. The vehicle body according to claim 11, wherein the center member comprises:
a front cross member laterally formed at the front bottom of a vehicle;
front side sills formed by bending both ends of the front cross member rearward;
a rear cross member laterally formed at the rear bottom of the vehicle; and
rear side sills formed by bending both ends of the rear cross member forward, respective front ends of the rear side sills being connected to respective rear ends of the front side sills with them facing each other.

14. The vehicle body according to claim 11, further comprising:
a front floor module formed by connecting the connecting members to the front member and the dash cross member, the front floor module being configured to support a front structure of a vehicle;
a rear floor module formed by connecting the connecting members to the rear member, the rear floor module being configured to support a rear structure of the vehicle;
a center floor module formed by connecting the connecting members to the center member, the center floor module being connected between a lower portion of the front floor module and a lower portion of the rear floor module; and
pillar side modules formed by connecting the connecting members to the pillar members, the front and rear of each of the pillar side modules being connected to the front and rear floor modules while both lower ends of the pillar side module are connected to the center floor module.

15. The vehicle body according to claim 11, wherein each fastening plate is connected by a fastener therethrough in a state in which the fastening plate is connected to an outer surface of the associated rigid member element.

16. The vehicle body according to claim 15, wherein the fastening plate is fixed to the associated rigid member element by welding a boundary therebetween.

17. The vehicle body according to claim 11, wherein:
each fastening plate has bending pails formed by bending both ends thereof; and
the bending parts are fixed to the associated rigid member element by a connector therethrough in a state in which the bending parts overlap both sides of the associated rigid member element.

18. A vehicle body comprising:
a rigid member having a tubular shape that is closed in cross-section, the rigid member comprising a front member, a dash cross member, a rear member, and a center member, which form main frames at the front, rear, and center of the bottom of the vehicle body, the rigid member also comprising pillar members that form main frames at both sides of the top of the vehicle body; and connecting members, each connecting member having a tubular shape that is open at one surface thereof, the connecting members being connected to the members of the rigid member;

wherein the center member comprises:
- a front cross member laterally formed at the front bottom of a vehicle;
- front side sills formed by bending both ends of the front cross member rearward;
- a rear cross member laterally formed at the rear bottom of the vehicle; and
- rear side sills formed by bending both ends of the rear cross member forward, respective front ends of the rear side sills being connected to respective rear ends of the front side sills with them facing each other.

19. The vehicle body according to claim 1, wherein the front member comprises:
- a front bumper beam laterally formed at the front bottom of a vehicle; and
- front side members formed by bending both ends of the front bumper beam rearward.

20. The vehicle body according to claim 1, wherein the rear member comprises:
- a rear bumper beam laterally formed at the rear bottom of a vehicle; and
- rear side members formed by bending both ends of the rear bumper beam forward.

* * * * *